United States Patent

Walters

[15] 3,661,308
[45] May 9, 1972

[54] CAMERA AND BINOCULAR CHEST SUPPORT FRAME

[72] Inventor: Samuel Walters, 3134 Dona Emilia Drive, Studio City, Calif. 91604

[22] Filed: Mar. 23, 1970

[21] Appl. No.: 21,805

[52] U.S. Cl. .................................................224/5 V
[51] Int. Cl. ..................................................A45f 5/00
[58] Field of Search ......................224/5 V, 5 S, 5 E, 5 R

[56] References Cited

UNITED STATES PATENTS

| | | | |
|---|---|---|---|
| 2,771,826 | 11/1956 | Shapiro | 224/5-22 X |
| 2,603,134 | 7/1952 | Burnam | 224/5-22 X |
| 817,207 | 4/1906 | Wheeler | 224/5-22 X |
| 2,711,122 | 6/1955 | Klumpp | 224/5-22 |
| 2,990,089 | 6/1961 | Nystrom | 224/5-22 |

Primary Examiner—Gerald M. Forlenza
Assistant Examiner—Jerold M. Forsberg
Attorney—Beehler & Arant

[57] ABSTRACT

A support frame for attachment to the lower portion of the chest, for supporting a viewing device such as a camera or pair of binoculars, and having adjustable means for locating the viewing device in a convenient viewing position, the support frame including a generally rectangular body plate which is vertically disposed with its rearward side surface being slightly concave in the horizontal plane, a support arm attached to the lower front central portion of the body plate and extending horizontally forwardly from the body plate, a vertically disposed collapsible post for supporting the viewing device at its upper end with the lower end of the post being attached to the support arm, the post being generally parallel to the body plate and being adjustable both as to its vertical height and as to its horizontal separation from the body plate, and at least one strap for supporting the frame from the person of the viewer.

The purpose of the above abstract is to provide a nonlegal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

4 Claims, 7 Drawing Figures

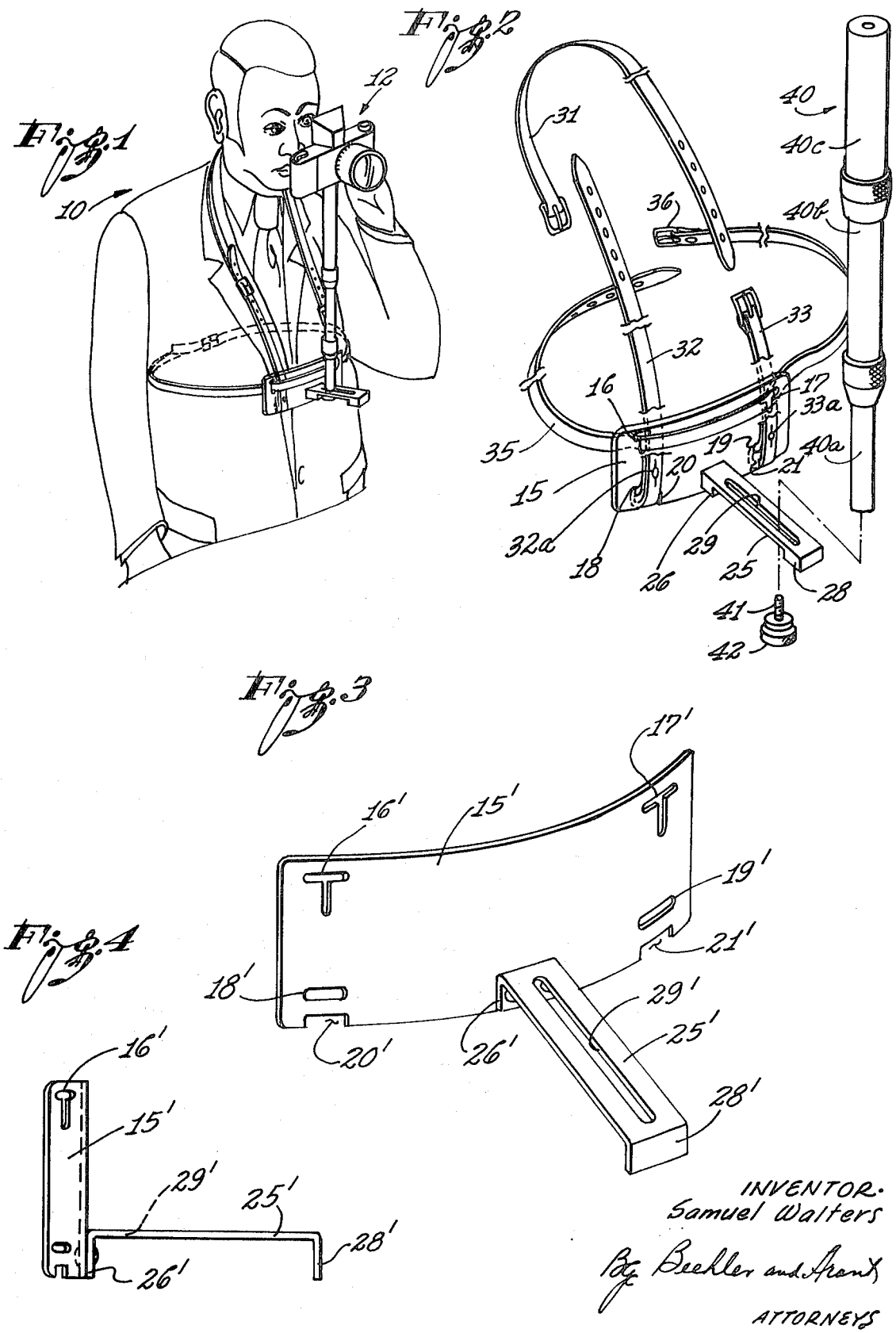

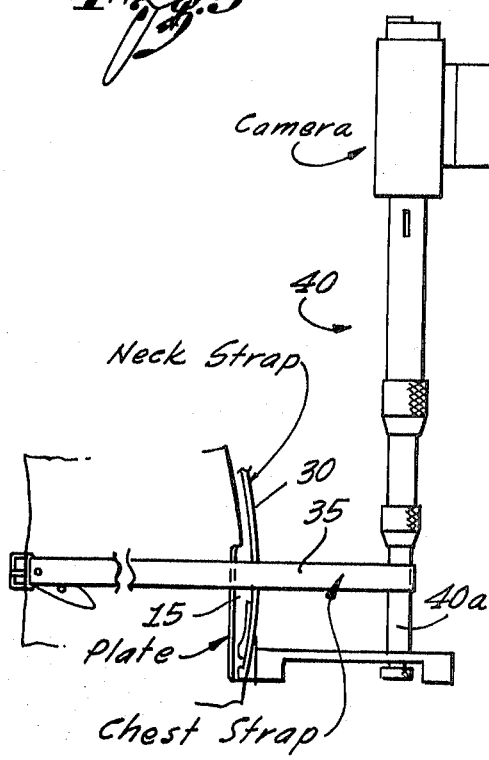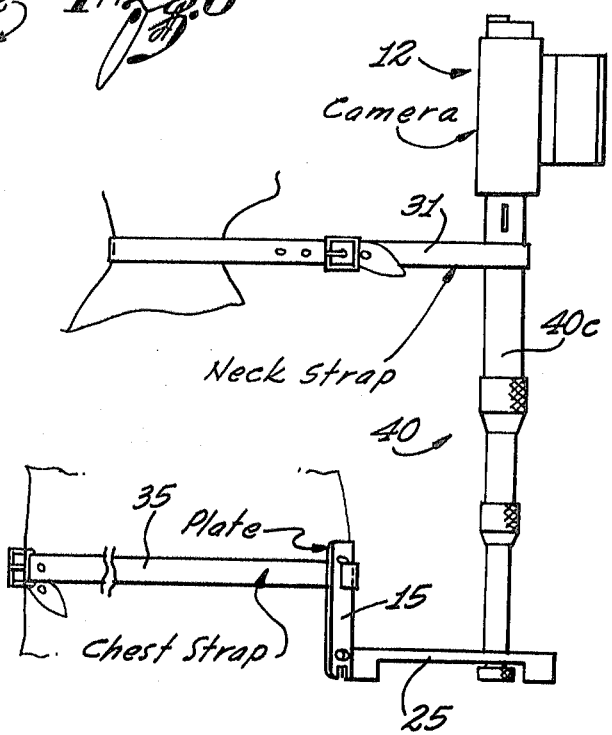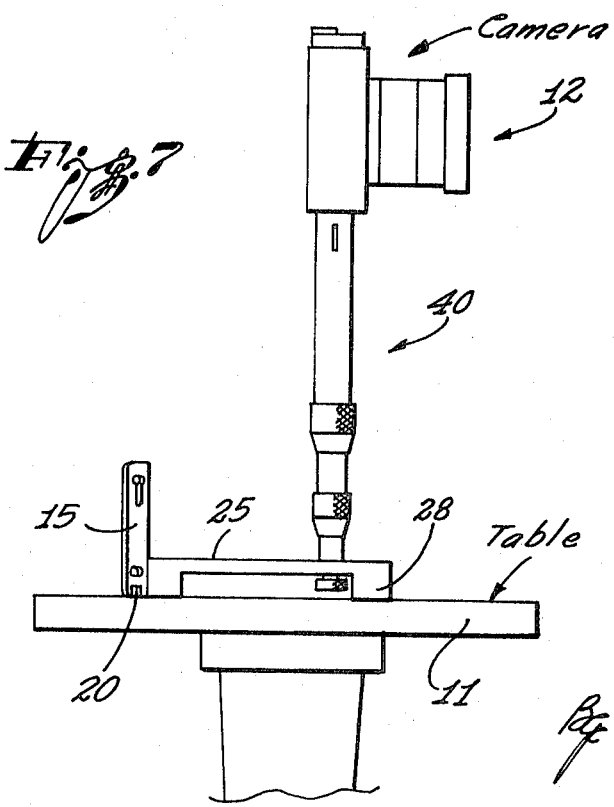

CAMERA AND BINOCULAR CHEST SUPPORT FRAME

BACKGROUND OF THE INVENTION

There are many occasions when a person using a viewing device such as a camera or pair of binoculars finds a definite need for supporting the device in a fixed position relative to his body. The need for such steady support is particularly critical, for example, when photographs are being taken by a camera equipped with a telephoto lens more than 1 foot forward from the camera. The telephoto lens adds considerable weight to the camera assembly and also affects the center of gravity.

A very recent development combines a camera with a pair of binoculars, the binoculars being used to align the camera and the camera shutter being actuated while the binoculars are maintained in their viewing position. The use of this apparatus is far more successful if the apparatus can be supported in a stable position from the person of the cameraman.

In the prior art there have been devices for supporting a camera or pair of binoculars from the body of a person, such as that disclosed in U.S. Pat. No. 2,771,826. However, those devices were very limited in their capabilities and hence have failed to fully achieve their intended purpose.

One of the premises upon which the present invention is based is that, for proper use of a camera, it must be supported some distance away from (in front of) the body of the cameraman.

Another premise which forms a basis for the present invention is that the support for the camera must be referenced to the rib structure of the chest, rather than being entirely dependent upon the soft flesh of the stomach for its support.

Thus, the object of the invention is to provide a new and useful support frame for a viewing device such as a camera or pair of binoculars, for supporting the viewing device in a position in front of the body and with reference to the rigid rib structure of the chest.

Another object of the invention is to provide such a device having suitable adjustments to accommodate to the different characteristics of different persons and the different kinds of camera and binocular equipment which they wish to use.

DRAWING SUMMARY

FIG. 1 is a perspective view showing the actual use of the present inventions;

FIG. 2 is an exploded perspective view of the adjustable support frame itself;

FIG. 3 is a perspective view of a modified form of the body plate and support arm;

FIG. 4 is a side view of the assembly of FIG. 3;

FIG. 5 is a side view illustrating a first alternate arrangement of the supporting straps;

FIG. 6 is a side view illustrating a second alternate arrangement of the supporting straps;

FIG. 7 is a side view showing use of the support stand on a flat table surface.

DETAILED DESCRIPTION

FIG. 1 illustrates the present invention being used by a man 10 for supporting a camera 12 in viewing position. The apparatus of the invention is more conveniently described with reference to FIG. 2.

As shown in FIG. 2 a body plate 15 has a generally rectangular configuration and is vertically disposed. The preferred dimensions of the body plate are a vertical height of 2 ½ inches and a length (horizontal dimension) of 8 inches. The body plate 15 is slightly curved throughout its length so that its rearward side surface is slightly concave in the horizontal plane, the front side surface being slightly convex. This curvature of the body plate makes a more convenient fitting to the lower chest surface of the man who uses it.

A rigid support arm 25 has its rearward end firmly attached to the lower front central portion of body plate 15, and extends in a horizontal direction forward from the body plate. The support arm 25 has a length of about 5 inches and carries a longitudinal slideway 29. On the outer end of support arm 25 a downwardly depending flange 28 is formed.

A collapsible post 40 is made of telescoping sections 40a, 40b, 40c in conventional fashion, and also includes means for locking the telescoping sections in either a fully extended, partially extended, or fully telescoped position. A short threaded bolt 41 having a finger grip or nut 42 is passed through the slideway 29 from underneath and engages a threaded opening in the lower end of post section 40a. Tightening of the hand grip or nut 42 serves to hold the collapsible post 40 in a firmly rigid vertical position, as shown in FIG. 1, so that it is generally parallel to the body plate 15. At the same time the slideway 29, by a loosening of the nut 42, makes it easily convenient to move the post 40 and hence the camera 12 either closer to or farther from the body of the cameraman.

A chest strap 35 having a buckle 36 extends around the chest of the cameraman for retaining the body plate 15 in position. Shown in FIGS. 1 and 2 the body plate 15 has openings 16, 17 near its upper corners. The chest strap 35 extends around the lower chest portion of the man 10, behind the corners of body plate 15, through the openings 16, 17 and hence across the front of the central portion of the body plate. The chest strap thus provides a firm support for the entire assembly including body plate 15, support arm 25, and post 40.

A neck strap 30 is made in three separate sections for maximum convenience of adjustment. A top section 31 passes over the shoulders and behind the neck of the user, and a right hand section 32 and a left hand section 33 extend out to the front. Sections 31 and 32 are joined together by means of a buckle on one part and a series of holes on the other, for convenient length adjustment. Sections 32 and 33 are joined together in a similar manner. The extreme ends of sections 32 and 33 are looped upon themselves and fastened at 32a, 33a, respectively.

As shown in FIG. 2 the body plate 15 has openings 18, 19 formed near its lower corners, these openings being elongated in a horizontal direction. Immediately beneath the openings 18, 19 slots or recesses 20, 21 are formed in the lower edge of the body plate. The neck strap section 32 passes over the front of body plate 15, hence through the notch or slot 20 and behind the body plate, then back through the opening 18 and is fastened to itself by fastener 32a in front of the body plate. Neck strap section 33 is fastened to the body plate in a similar manner.

In the apparatus of FIGS. 1 and 2 the body plate 15 and support arm 25 are relatively thick members of rigid transparent plastic material. However, as will be readily apparent to those skilled in the art, there are various other ways of fabricating these members.

In the manner in which the chest strap 35 and neck strap 30 are fastened as shown in FIGS. 1 and 2, there is a necessary crossing over of these two straps. As shown in the drawings the neck strap bears directly on the front surface of body plate 15 while the chest strap 35 passes over the neck strap, and hence is spaced a short distance in front of the body plate. The alternative method of connection may also be used, however, with chest strap 35 bearing directly on the front surface of the body plate, and the neck strap then passing over the front of the chest strap.

Reference is now made to FIGS. 5 and 6 showing other methods of connecting the supporting straps.

As shown in FIG. 5 the neck strap 30 may be connected in the same manner as shown in FIGS. 1 and 2, while the chest strap 35 passes around the post section 40a and does not even contact the body plate 15.

Another variation of the strap connections, suggested but now shown by FIG. 5, is that chest strap 35 may be passed through the opening 16, 17 and hence around the post section 40a. That method of connecting the straps is perhaps preferred, as providing the most stable support for the support frame of the present invention.

Another strap arrangement is shown in FIG. 6 where it is seen that the chest strap 35 is connected in the same manner as shown in FIGS. 1 and 2. However, the neck strap rather than hanging down in front is arranged in substantially a horizontal plane (the strap section 31, only) and passes around the telescoping section 40c of post 40.

As shown in FIG. 7 the support frame of the present invention may also be used for supporting a camera directly from a flat surface such as a table top. As shown in FIG. 7 the lower edge of body plate 15 rests directly upon the table top 11, and the downwardly turned flange 28 at the outer end of support arm 25 also rests upon the table top. Thus, the support arm flange together with the lower edge of the body plate provides a tripod support for the camera.

In FIG. 7 the chest strap 35 and neck strap 30 are not shown, because they are not necessary for that particular application. However, it is more convenient to the user of the equipment if he can leave the straps in place while using the support frame as a tripod. The apparatus of the present invention is adapted for this purpose by means of the slots or notches 20, 21 which receive the looped-over ends of straps 32, 33 and hence permit the rigid lower edge of the body plate 15 to bear directly upon the supporting surface, such as table top 11.

MODIFIED FORM

FIGS. 3 and 4 show a modified form of the body plate and support arm, in which these parts are made of metal and are relatively thinner than the plastic parts shown in FIGS. 1 and 2.

Thus, in FIG. 3 the body plate $15^1$ has the same configuration as body plate 15 but is thinner and is not transparent. The openings $16^1$ and $17^1$ are T-shaped so that they may be used either for attachment of the horizontally arranged chest strap 35, as previously shown, or else for attaching the neck strap to the upper edge of the body plate rather than to its lower edge. Near the lower corners of the body plate the openings $18^1$, $19^1$ and the notches or slots $20^1$, $21^1$ have the same configurations as previously described.

In FIG. 3 the support arm 25 is simply a flat metal strip having its inner end turned down to form an inner end flange $26^1$ and its outer end turned down to form an outer end flange $28^1$. Slideway $29^1$ is provided as before. The inner end of support arm $25^1$ is attached as by rivets to the body plate $15^1$.

Although in the present drawings the support arm is shown provided with a continuous slideway, it will be readily apparent that a series of adjustment holes may instead be provided, the spacing between adjacent holes being preferably about ½ inch in order to provide the desired range of position adjustment for the post 40.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. An adjustable camera and binocular chest support frame comprising:

a generally rectangular body plate adapted to be vertically disposed with its rearward side engaging the lower portion of the chest of a person, being of the order of 2 ½ inches vertical height and 8 inches horizontal length, said body plate being slightly curved so that its rearward side surface is slightly concave in the horizontal plane;

a support arm attached to the lower front central portion of said body plate and extending horizontally forwardly therefrom, said support arm having a longitudinal slideway formed therein;

a collapsible post having a threaded bolt on its lower end, said threaded bolt extending downward through said slideway of said support arm and being retained by a nut, said post extending vertically above said support arm in a generally parallel relationship to said body plate, said slideway permitting adjustment of the horizontal distance between said post and said body plate;

means for attaching a viewing device to the upper end of said post; and a chest strap forming a horizontal loop and adapted to extend about one of said body plate and post;

said support arm having a downwardly depending flange on its forward end, said flange together with the lower edge of said body plate providing a tripod support for the viewing device when said frame is disposed upon a flat supporting surface.

2. An adjustable camera and binocular chest support frame comprising:

a generally rectangular body plate adapted to be vertically disposed with its rearward side engaging the lower portion of the chest of a person, being of the order of 2 ½ inches vertical height and 8 inches horizontal length, said body plate being slightly curved so that its rearward side surface is slightly concave in the horizontal plane;

a support arm attached to the lower front central portion of said body plate and extending horizontally forwardly therefrom, said support arm having a longitudinal slideway formed therein;

a collapsible post having a threaded bolt on its lower end, said threaded bolt extending downward through said slideway of said support arm and being retained by a nut, said post extending vertically above said support arm in a generally parallel relationship to said body plate, said slideway permitting adjustment of the horizontal distance between said post and said body plate;

means for attaching a viewing device to the upper end of said post;

a chest strap forming a horizontal loop and adapted to extend about one of said body plate and post; and a neck strap forming a loop and adapted to be worn about the neck of the person;

said support frame having respective openings near the lower corners of said body plate, the two ends of said neck strap passing down over the front of said body plate, being then looped behind said body plate and through respective ones of said openings and then secured to themselves.

3. A support frame as claimed in claim 2 wherein said support arm has a downwardly depending flange on its forward end, said flange together with the lower edge of said body plate providing a tripod support for the viewing device when said frame is disposed upon a flat supporting surface.

4. A support frame as claimed in claim 3 which additionally has slots formed in the lower edge of said body plate to receive said neck strap ends.

* * * * *